United States Patent
Reynolds

(10) Patent No.: US 6,888,673 B2
(45) Date of Patent: May 3, 2005

(54) PORTABLE OPTICAL MAGNIFYING DEVICE

(76) Inventor: Barry Thomas Reynolds, 41 Eastbrooks Place, Pitsea, Essex, SS13 3QR (GB)

( * ) Notice: Subject to any disclaimer, the term of this patent is extended or adjusted under 35 U.S.C. 154(b) by 79 days.

(21) Appl. No.: 10/311,262

(22) PCT Filed: Jun. 14, 2001

(86) PCT No.: PCT/GB01/02595

§ 371 (c)(1), (2), (4) Date: Dec. 12, 2002

(87) PCT Pub. No.: WO01/96931

PCT Pub. Date: Dec. 20, 2001

(65) Prior Publication Data

US 2003/0206354 A1 Nov. 6, 2003

(30) Foreign Application Priority Data

Jun. 14, 2000 (GB) .................................... 00 14490.7

(51) Int. Cl.[7] ............................................. G02B 21/00
(52) U.S. Cl. ...................................... 359/368; 359/818
(58) Field of Search ................................ 359/362, 368, 359/379, 422, 425, 426, 801, 802, 803, 818

(56) References Cited

U.S. PATENT DOCUMENTS

| | | | |
|---|---|---|---|
| 5,497,267 A | * | 3/1996 | Ishikawa et al. ............ 359/390 |
| 6,249,344 B1 | * | 6/2001 | Virag ......................... 356/244 |
| 6,313,943 B1 | * | 11/2001 | Ikado et al. ................ 359/368 |
| 6,628,458 B1 | * | 9/2003 | Brock ........................ 359/383 |

* cited by examiner

Primary Examiner—Mark A. Robinson
(74) Attorney, Agent, or Firm—Renner, Kenner, Greive, Bobak, Taylor & Weber

(57) ABSTRACT

A portable optical magnifying device (1), for observing specimens within a specimen-vessel having a transparent flat wall, comprises an eyepiece (4) and an objective (3), a light-path being defined therebetween. The device (1) includes a spacer (7) arranged at least partly around the objective (3) and which is adapted in use to seat the device (1) against the flat wall of the specimen vessel with the objective (3) closely adjacent but spaced therefrom, and with its optical axis normal thereto. The device (1) further includes means (9) for releasably attaching the device (1) to the flat wall, with the space (7) bearing against the flat wall of the specimen vessel. Attachment is achieved by evacuation of the space between objective lens, spacer and flat wall.

12 Claims, 2 Drawing Sheets

PORTABLE OPTICAL MAGNIFYING DEVICE

Figure 1:
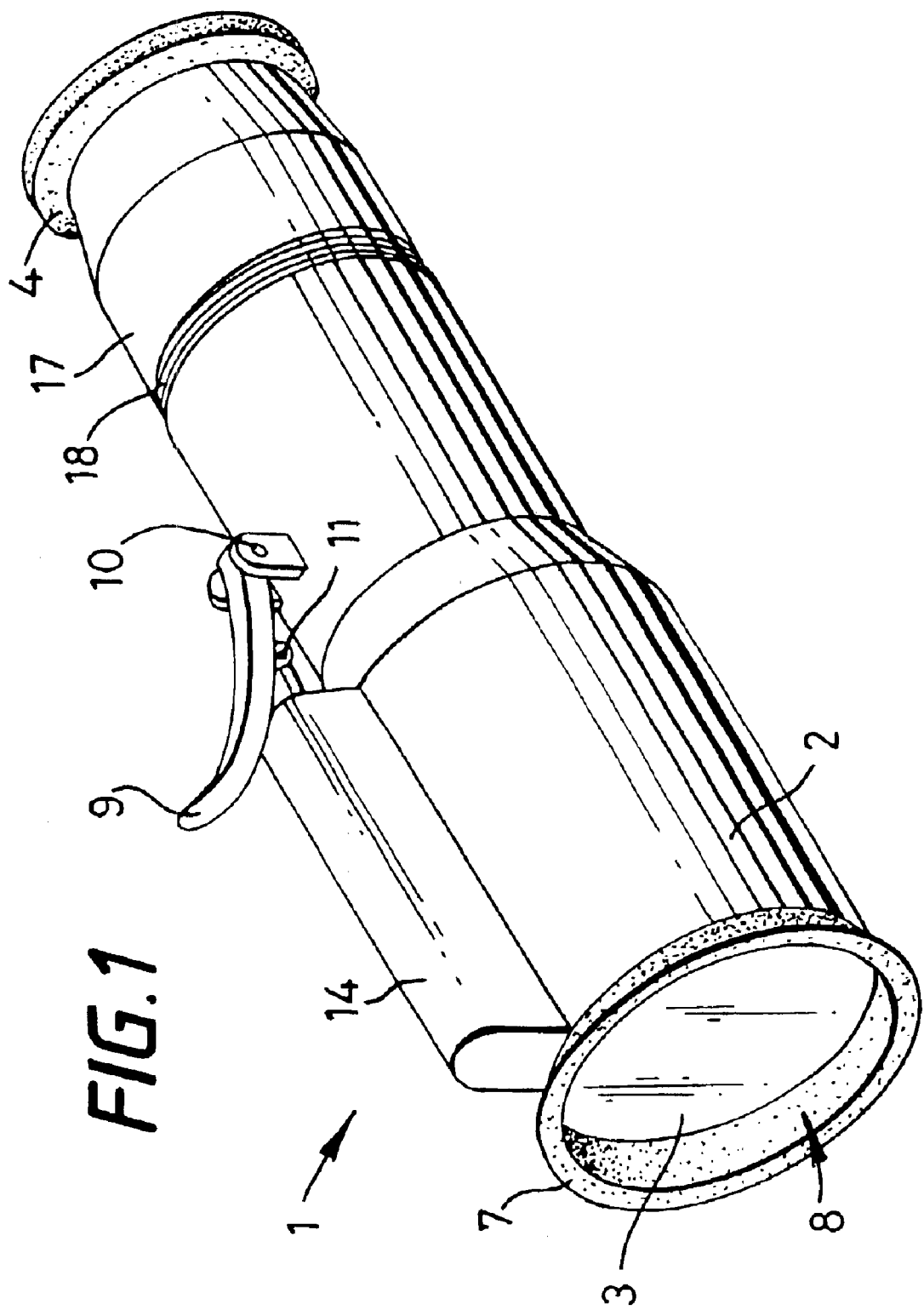

This invention relates to a portable optical magnifying device, intended primarily for use as a non-invasive tool for the observation of specimens within an observation vessel such as e.g. a transparent-walled tank. It has, in particular, been developed for the study of fish and other aquatic life-forms within a glass-walled tank or aquarium, but it is envisaged that it will also find use in other fields such as biology, zoology and so on where the non-invasive or non-destructive study of animate or inanimate specimens is desirable, even perhaps elsewhere as for instance in geology &c.

Studying small plants or animals in their natural environment can often present problems. For example, one may wish to observe small fish or coral inside a tank, without removing the specimens from that environment. Conventional microscopes are usually too bulky to be manipulated into the required position, and are likely to give a distorted image due to refraction effects associated with light passing through several media. Thus for instance when studying fish in a tank, the light must pass through water, then the glass or transparent plastics in the tank walls, and then air before it enters the lens system of the magnifying device, thus traversing three or four phase-boundaries between different media, each causing refraction of the light. As long as the axis of the light path is normal to the phase-boundaries, the distortion is negligible, but if the magnifying device used presents its objective lens to the tank-wall obliquely, and thus the light-path along the axis of the device is not normal to the walls of the tank, then the distortion can be quite noticeable.

Moreover, simple hand-held devices such as magnifying glasses have a limited range of focus, and hence only a limited magnifying power. The alternative of incorporating a magnifying effect into the walls of such a transparent tank also has the same limitations, as well as greatly increasing the cost of the tank.

There is therefore a need for a simple magnifying device which will possess both the magnifying power and resolution of a conventional low-power microscope. Such a device must moreover retain as much as possible of the ease of handling of a simple, hand-held magnifying glass, and yet when in use it must be held firmly in position pointing normal to the plane of the transparent tank wall, so as thus to avoid or at least alleviate the distortion effects associated with observing a magnified image obliquely through a plurality of phase boundaries. Additionally, it must remain low in cost, and be versatile enough to be switched easily from one observation vessel to another.

These aims can be attained by way of the device of the present invention, which provides a portable optical magnifying device that is lightweight and simple in construction and easy to use, that can provide adequate magnification and depth of focus to serve its purpose in a wide range of fields of study, and that can be correctly positioned in a reproducible manner upon any flat-walled observation vessel.

According to the present invention, there is provided a portable optical magnifying device defining a light-path between an eyepiece and an objective for observing specimens within an observation vessel having a transparent flat wall, which device includes a spacer arranged at least partly around said objective lens and which spacer is adapted in use to seat the device against the flat wall of the specimen vessel with the objective closely adjacent but spaced therefrom, and with its optical axis normal thereto, and the device further includes means for releasably attaching the device to the flat wall with the spacer bearing against the flat wall of the specimen vessel.

This arrangement has the advantages that the attachment of the device to the wall enables the objective to be seated closely-adjacent and normal to the wall thus reducing the distortion and refraction effects described above, and then holding the device firmly in the required position, thus enabling "hands-free" operation, so that the observer may, for example, easily take notes and then refer back to the specimen without having to reset the magnifying device each time.

Optical magnifying arrangements have of course been known for centuries, and over the years there have naturally been many and varied developments in the construction and operation of optical telescopes and microscopes, yet the fundamental principles of optics are well-established, remain essentially unchanged, and are applied appropriately in the device of this invention. The detailed construction of the optical array utilised in the device is therefore not the direct concern of the present invention, and accordingly will not be discussed except in generalities.

This however can be said, that for most currently-envisaged purposes the objective will preferably be a wide-angle lens, thus allowing the observer to perceive a greater depth of field (giving rise to a so-called "3D" effect), and/or the light-path within the device will desirably traverse an aperture, advantageously in the form of an adjustable iris thus enabling the user to adjust the size of the aperture. The smaller the aperture, the sharper the focus of the image will be; and by varying the size of the aperture it thus becomes possible to control the depth of focus of the optical array.

In a preferred form of construction, the optical magnifying device will advantageously comprise an objective and an eyepiece located at opposite ends of a generally-tubular housing within which is provided an intermediate optical array comprising an aperture, and one or more lens(es).

In order to allow the observer to adjust the focus of the image, the housing will preferably be at least partly telescopically tapered, usually at the eyepiece end thereof, and the mating telescopic sections will be threadedly-interengaged via screw-threads provided internally and externally of the respective sections so that the separation of the eyepiece from the rest of the optical array may be varied for fine adjustment of the focus.

Although in the simplest form of construction the optical axis of the eyepiece will be co-axial with that of the objective, it may be more convenient in use for the observer if it is canted upwards relative thereto, often best at an angle of about 45° from the horizontal. When that is desired, the intermediate optical array within the housing may optionally also include one or more prism(s) or other reflector(s) to divert the light-path so as to enable the observer to view the image at an angle to the optical axis of the objective.

It is also envisaged that the device of the present invention could be adapted so as to enable a camera to be mounted at the eyepiece, thus allowing the specimen to be recorded on photographic film or video-tape.

It is further envisaged that the present invention may be adapted so as to include a manual or automatic zoom lens facility.

The spacer may be a forwardly-projecting continuous rim on the housing surrounding the objective, or it may at the other extreme be no more than three forwardly-projecting abutments. Whatever the exact construction of the spacer, it (or its components) will advantageously be faced with or made from a relatively non-compressible but slightlyresilient rubbery or like plastics material, so that in use it will accurately locate the device on the transparent wall of the observation vessel with the objective correctly spaced therefrom and aligned with its axis normal thereto.

The means for releasably attaching the device to the flat wall will most conveniently be suction means operable to mount the device detachably thereon with its objective closely adjacent, to the surface of any desired flat-walled observation vessel.

The suction means may conveniently comprise an evacuation chamber created between the external surface of the objective lens and the open end of the tubular housing on the one hand, and the flat-walled observation vessel. A substantially air-tight seal, preferably in the form of a rubber gasket ring is provided around the end of the tubular housing. The evacuation chamber is arranged to communicate with evacuation means, located externally on the housing. When the evacuation means is activated it will partially evacuate the chamber, thus allowing the magnifying device to be detachably mounted by suction, either on the surface of the observation vessel containing the specimen, to be studied, or possibly in certain circumstances, upon the specimen itself.

In a currently preferred embodiment of this invention, the evacuation means comprises a piston chamber which communicates with the evacuation chamber via an opening in the housing, and a piston plunger within the piston chamber which when activated, causes evacuation of the evacuation chamber. The activation of the piston plunger can be achieved by means of a lever hingedly mounted externally of the housing.

In certain circumstances it may be desirable to include something in the nature of a flap-valve to prevent re-entry of air into the evacuation chamber from the piston cylinder. In such a case however there should also be provided some means for the vacuum to release the device.

The optical magnifying device of this invention has been developed with the particular purpose of facilitating the observation of animate specimens moving, perhaps quite freely in an aquatic environment, e.g. within a glass-walled aquarium tank or the like, and it will therefore now be further described with particular emphasis on that application.

The use of the present invention allows the observer to view specimens at distances of from 7.5 to 90 cm from the user, and to provide a magnification effect in the range of from 10× to 30×.

In currently preferred embodiments of the invention, the housing is constructed from an alloy of aluminium, but it may also be constructed from plastics materials such as PVC, polycarbonate or polyurethane. The relatively-incompressible rubbery gasket seal is preferably constructed from neoprene or nitrile rubber. A similar seal may also be provided for comfort, at the eyepiece.

The present invention extends to include a kit of parts (whether assembled or not) comprising the portable optical magnifying device as herein described in conjunction with an observation vessel.

Figure 2:
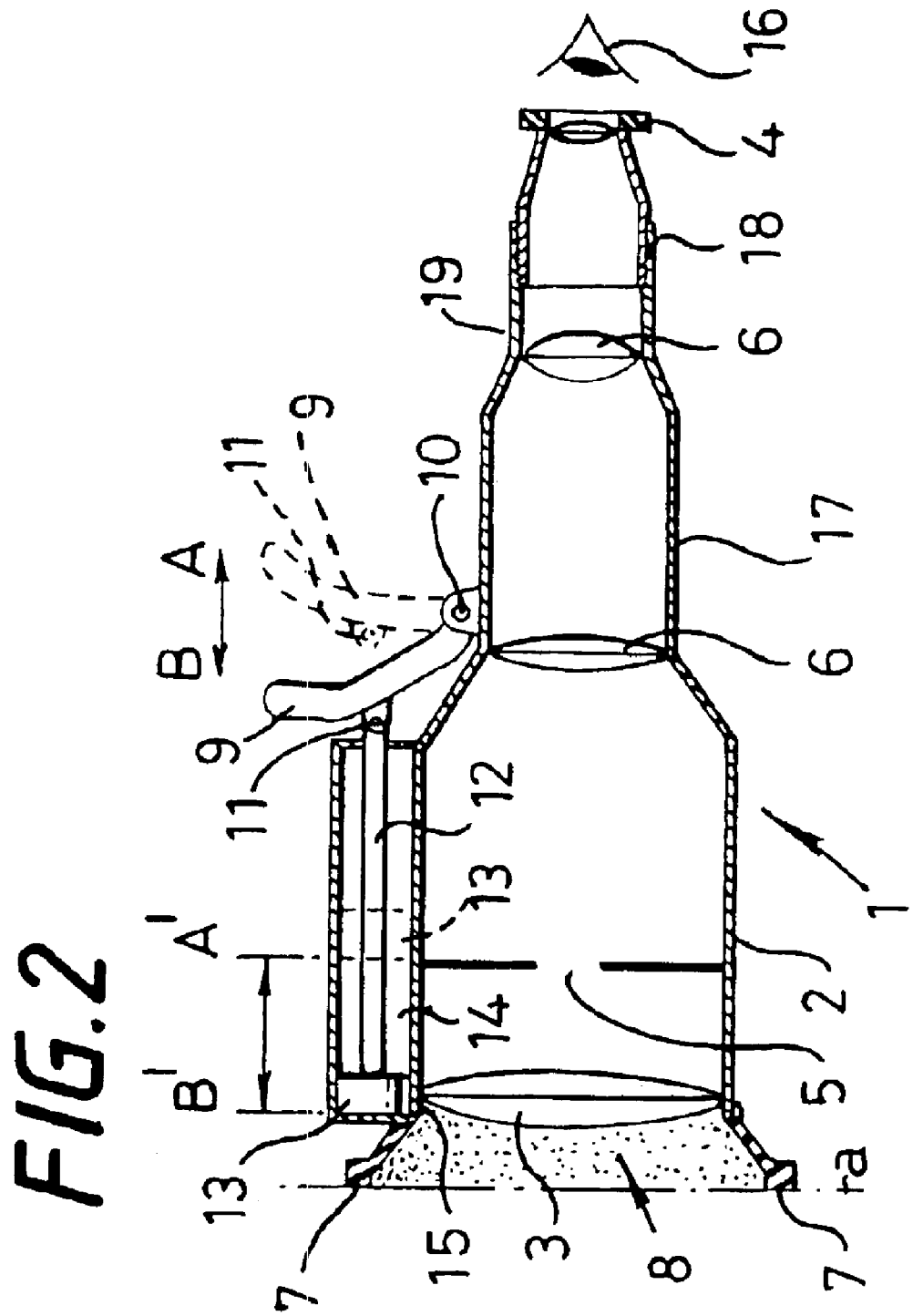

In order that the present invention may be more fully understood, one simple embodiment thereof will now be described in more detail, though only by way of illustration, with reference to the accompanying drawings, in which:

FIG. 1 is a perspective view of a portable optical magnifying device according to the present invention; and FIG. 2 is a diagrammatic representation of a vertical cross-section along the longitudinal axis of the portable optical magnifying device of FIG. 1.

As depicted in FIGS. 1 & 2, a portable optical magnifying device, generally indicated 1, comprises a generally-tapered, semi-telescopic housing 2, fitted at one end with a lens 3 serving as the objective, and at the other end with a lens 4 serving as the eyepiece. Within the housing, between the objective and the eyepiece there is provided a suitable optical array, essentially (as shown) comprising an aperture 5 and one or more lens(es) 6.

The optical details of the objective, eyepiece and any intervening optical array are not the direct concern of the present invention, and may be determined as appropriate by those expert in such matters. It is therefore only necessary here to say that the lens train used should be such as to provide a wide-angle objective lens with a field of focus, beyond and thus inside the wall to which the optical device will be attached when in use, deep enough to yield an adequately resolved image throughout at least a major part of the overall thickness of the specimen vessel (e.g. aquarium).

The depth of focus available with any particular lens-train is in some measure dependent on the size of the aperture. Therefore, in preferred but more expensive embodiments of the invention, the aperture 5 may advantageously take the form of an adjustable, variable-size iris, which will enable the depth of focus to be adjusted. In such a case means for manual adjustment thereof (not here shown) will be provided externally on the housing 2.

At this point it should also be noted that for many purposes it may be desirable for the eyepiece 4 to be offset, e.g. to be canted upwards, so that it is more conveniently accessible to the eye of the observer. For that purpose the optical array 5,6 within the housing 2 may also include one or more prism(s) (not shown), as appropriate, so as to deflect the light path from the objective towards the offset-eyepiece.

The objective-end of the tapered housing 2 projects beyond the objective lens 3 and is surrounded by a flexibly-resilient cup-shaped seal 7. The space between the objective lens 3 and the seal 7 (when the latter is placed in contact with a flat surface, as indicated by dotted line a in FIG. 2, such as an aquarium wall) defines an evacuation chamber, generally indicated 8, therebetween. The seal 7 will generally be made in the form of a natural or synthetic rubber gasket ring around the rim of the cup-shaped walls.

In use, the seal 7 is placed in contact with the flat, transparent surface of a specimen vessel (not shown) such as an aquarium wall, and then the chamber 8 is partially evacuated so as thus to attach the whole optical device in situ on the specimen vessel, so that an observer can now view specimens therewithin. Evacuation of the chamber 8 is effected by moving a lever 9 from its rest position B, as shown in dotted lines in FIG. 2 to its activated position A. The base of lever 9 is hingedly secured to the housing 2 via a pivot-pin 10, about which it can be moved between positions A and B. The mid-point of lever 9 is connected via a second pivot-pin 11 to an articulated linkage connected to the end of a piston-rod 12 having a plunger 13 at its opposite end, both mounted within piston-cylinder 13. Movement of the lever 9 between positions B and A causes the rod 12 and plunger 13 to move within piston-cylinder 14, from the plunger's rest position B' to its activated position A'.

At the objective-end of the device, the piston-cylinder 14 communicates with the evacuation chamber 8 via an opening 15 in the rim of the housing 2. Upon movement of the plunger 13 from position B' to position A', air is sucked from the evacuation chamber 8, through the opening 15. The resultant reduced pressure within evacuation chamber 8 causes the gasket seal ring 7 to flex and seat itself in air-tight contact with the wall of the specimen vessel. It is the partial vacuum suction effect within chamber 8 which effects the temporary attachment of the magnifying device 1 to the specimen vessel.

An observer (here represented by eye 16) may adjust the focus of the device by means of an adjustable cylinder 17 bearing one or more of the lens(es) and/or prism(s) 6 constituting the optical array. The cylinder 17 may be rotated within the main housing 2 by means of fine screw threads 18 located on the external surface of the cylinder 17 which co-operate with fine screw threads 19 located on the internal surface of the housing 2, thus adjusting the distance between the lens(es) and/or prism(s) 6 mounted within the cylinder 17, and the remainder of the optical array.

What is claimed is:

1. A portable optical magnifying device for observing specimens within a specimen-vessel having a transparent flat wall, said device having an eyepiece and an objective and comprising:

a substantially tubular, telescopically-tapered and axially-adjustable housing;

a further optical array provided within said housing, said array comprising an aperture and at least one lens;

an evacuation chamber created between the objective and an open end of said tubular housing, said open end being provided with a substantially air-tight seal; and evacuation means located externally on the housing, said evacuation means communicating with said chamber such that, when activated, said chamber is partially-evacuated, thus allowing the magnifying device to be detachably mounted by suction on said flat wall.

2. A portable magnifying device as claimed in claim 1, in which the evacuation means comprises a piston chamber which communicates with the evacuation chamber via an opening in the housing, and a piston plunger within a piston chamber which when activated, causes evacuation of said evacuation chamber.

3. A portable magnifying device as claimed in claim 2, in which the piston plunger is activated by means of a hingedly-mounted lever operable from outside the housing.

4. A portable magnifying device as claimed in claim 1, in which the objective is a wide-angle, deep-focus lens.

5. A portable magnifying device as claimed in claim 1, in which the aperture takes the form of an adjustable iris.

6. A portable magnifying device as claimed in claim 1, in which the housing is constructed in telescopic sections so as to enable the focus of the device to be adjusted.

7. A portable magnifying device as claimed in claim 1, in which the substantially air-tight seal is in the form of a rubber gasket ring.

8. A portable magnifying device as claimed in claim 7, in which the rubber gasket seal is made from neoprene or nitrile rubber.

9. A portable magnifying device as claimed in claim 1, so constructed as to achieve a magnification effect in the range of from 10× to 30×.

10. A portable magnifying device as claimed in claim 1, in which the eyepiece is provided with means for mounting a photographic or video camera.

11. A portable magnifying device as claimed in claim 1, in which the housing is constructed at least predominantly from aluminium and/or alloy(s) thereof.

12. A portable magnifying device as claimed in claim 1, in which the housing is constructed at least predominantly from plastics material.

* * * * *